(12) United States Patent
Furukawa

(10) Patent No.: US 7,212,790 B2
(45) Date of Patent: May 1, 2007

(54) COMMUNICATION APPARATUS IN RADIO NETWORK, TRANSMISSION CONTROL METHOD, THRESHOLD VALUE CONTROL METHOD, AND RADIO NETWORK SYSTEM

(75) Inventor: Hiroshi Furukawa, Tokyo (JP)

(73) Assignee: NEC Corporation, Tokyo (JP)

( * ) Notice: Subject to any disclaimer, the term of this patent is extended or adjusted under 35 U.S.C. 154(b) by 552 days.

(21) Appl. No.: 10/739,091

(22) Filed: Dec. 19, 2003

(65) Prior Publication Data
US 2004/0132415 A1    Jul. 8, 2004

(30) Foreign Application Priority Data
Dec. 25, 2002   (JP)   ............... 2002-373348

(51) Int. Cl.
*H04B 1/44*   (2006.01)
(52) U.S. Cl. .................... 455/83; 455/79; 455/116
(58) Field of Classification Search ............. 455/78, 455/83, 114.2, 116, 129
See application file for complete search history.

(56) References Cited

U.S. PATENT DOCUMENTS

| | | | |
|---|---|---|---|
| 5,553,316 A | | 9/1996 | Diepstraten et al. |
| 5,721,733 A | * | 2/1998 | Wang et al. ............. 370/332 |
| 6,157,616 A | * | 12/2000 | Whitehead ............. 370/252 |
| 6,792,253 B2 | * | 9/2004 | Osaka ............. 455/226.4 |
| 6,799,053 B2 | * | 9/2004 | Miyoshi et al. ............. 455/522 |
| 6,934,554 B2 | * | 8/2005 | Mizuno et al. ............. 455/502 |

FOREIGN PATENT DOCUMENTS

| | | |
|---|---|---|
| EP | 0 903 891 A1 | 3/1999 |
| EP | 1 104 961 A | 6/2001 |
| JP | 6-29981 | 2/1994 |
| JP | 2001-217848 | 8/2001 |

\* cited by examiner

*Primary Examiner*—Lana Le
*Assistant Examiner*—Christian A. Hannon
(74) *Attorney, Agent, or Firm*—Dickstein Shapiro LLP

(57) ABSTRACT

The carrier detector 5 notifies the threshold value controller 6 of the received power value of a received signal and then controls various portions so as to defer transmission of the transmission signal when receiving a signal having a received power exceeding a threshold value Rth from the threshold value controller 6. The demodulator 3 notifies the threshold value controller 6 of a transmission source included in the received signal. The modulator 4 notifies the threshold value controller 6 of the destination of the transmission signal. The threshold value controller 6 outputs the received power value of a received signal from the destination, as a threshold value Rth, to the carrier detector 5.

18 Claims, 8 Drawing Sheets

FIG. 3

| ADDRESS | CARRIER DETECTION THRESHOLD VALUE |
|---|---|
| A | -74 dBm |
| B | -80 dBm |
| C | -22 dBm |
| D | -43 dBm |
| ⋮ | ⋮ |

COMMUNICATION APPARATUS IN RADIO NETWORK, TRANSMISSION CONTROL METHOD, THRESHOLD VALUE CONTROL METHOD, AND RADIO NETWORK SYSTEM

BACKGROUND OF THE INVENTION

The present invention relates to communication apparatuses in radio networks, transmission control methods, threshold value control methods, programs, and radio network systems. Particularly, the present invention relates to communication apparatuses in radio networks, which defers transmission of transmission signals when signals, each having a received power exceeding a threshold value, are received.

The CSMA (Carrier Sense Multiple Access) scheme is applied in the access control scheme for communication apparatuses in the radio LAN (Local Area Network), typified by the IEEE (Institute of Electrical and Electronics Engineers) 802.11 standard.

Unlike the FDD scheme (Frequency Division Duplex scheme), the CSMA scheme utilizes the upstream line and the downstream line, with the same channel segregated. The significant concept of the CSMA scheme is that each communication apparatus performs carrier sensing (carrier detection). Transmission is suppressed when the signal having a received power exceeding a specified value (hereinafter referred to as a carrier detection threshold value) is being received. The intention is that communication apparatuses make mutual concessions of transmission to reduce interference between them. The conventional radio communication apparatus, which realizes the CSMA scheme, will be explained below.

FIG. 7 is a diagram illustrating the configuration of a conventional communication apparatus employing the IEEE 802.11 standard. Referring to FIG. 7, the communication apparatus consists of an antenna 110, a switch 120, a demodulator 130, a modulator 140, and a carrier detector 150. The switch 120, which is controlled by the carrier detector 150, selects the demodulator 130 or the modulator 140 according to the switching signal from the carrier detector 150.

The carrier detector 150 receives the signal received with the antenna 110 and then measures the received power thereof. The carrier detector 150 compares a predetermined carrier detection threshold value Rth with the measured received power. When the measured received power is larger than the threshold value Rth or a modulation intended signal (a transmission signal to be transmitted) in a transmission waiting state does not exist, the carrier detector 150 controls the switch 120 to connect the demodulator 130 to the antenna 110. If not so, the carrier detector 150 controls the switch 120 to connect the modulator 140 to the antenna 110 after the waiting for a random time. Moreover, using the transmission indication signal, the carrier detector 150 commands the modulator 140 to transmit the modulation intended signal. The modulator 140 notifies the carrier detector 150 of the presence or absence of the modulation intended signal, using a modulation intended signal presence/absence signal.

The reason for random time waiting is as follows. That is, when the communication apparatus changes from a carrier detection state (or a demodulation state) to a carrier non-detection state (or a transmittable state), other radio communication apparatuses distributed around the communication apparatus similarly change from the demodulation state to the transmittable state. Thus, if both the communication apparatuses simultaneously transmit their transmission signals, without the random time waiting, the two radio signals are superimposed, thus being received by other radio communication apparatuses.

The modulator 140 has a buffer (not shown). If the carrier detector 150 does not indicate transmission of a transmission signal, regardless of the transmission signal being received by the modulator 140, the modulator 140 stores the transmission signal into the buffer. After the transmission indication from the carrier detector 150, the modulator 140 outputs the transmission signal in the buffer to the antenna 110. Alternatively, transmission signals with low priority may be discarded without storing in the buffer.

As explained above, in the communication apparatus shown in FIG. 7, transmission stands by in the state where signals are being received from other communication apparatuses. This makes it possible to prevent interference to other communication apparatus, which is receiving the corresponding signals, before it happens. With all neighboring radio communication apparatuses that perform the waiting operation, alternate transmission can be performed so as to prevent interference between them.

FIG. 8 is a diagram illustrating the configuration of the conventional radio communication apparatus described in the patent document 1. Referring to FIG. 8, the communication apparatus consists of an antenna 210, a demodulator 220, a carrier detector 230, a transmission threshold value control/transmission controller 240, a transmission threshold value register 250, and a modulator 260.

The demodulator 220 and the carrier detector 230 accept the signal received by the antenna 210. The carrier detector 230 measures the received power of the received signal and outputs the measured power value to the transmission threshold value control/transmission controller 240. At the same time, the carrier detector 230 compares a predetermined carrier detection threshold value Rth with the measured received power and then outputs the carrier detection signal to the transmission threshold value control/transmission controller 240 when the measured received power is larger than the threshold value Rth.

The demodulator 220 detects the network ID included in the received signal and then outputs it to the transmission threshold value control/transmission controller 240. The transmission threshold value control/transmission controller 240 refers to the received power value and the carrier detection signal from the carrier detector 230 and the transmission threshold value held in the transmission threshold value register 250 and then outputs a transmission enable/disable signal to the modulator 260. The transmission threshold value control/transmission controller 240 varies the transmission threshold value held in the transmission threshold value register 250 based on the received power value from the carrier detector 230 and based on the network ID from the demodulator 220.

The transmission threshold value control/transmission controller 240 indicates transmission enabling or disabling to the modulator 260, as follows. That is, when the transmission threshold value control/transmission controller 240 receives a carrier detection signal, representing detection of a carrier, from the carrier detector 230, or when a measured received power exceeds a transmission threshold value, the transmission threshold value control/transmission controller 240 outputs a transmission enable/disable signal indicating suppression of transmission to the modulator 260. With the above-mentioned requirements not satisfied, the transmission threshold value control/transmission controller 240 outputs a transmission enable/disable signal indicating permission of transmission to permit the modulation and transmission of a modulation intended signal (a transmission signal to be transmitted) in the modulator 260 to the modulator 260 after waiting for a random time. When receiving transmission permission from the transmission threshold value control/transmission controller 240, the modulator 260 outputs the transmission signal to the antenna 210 after waiting for the random time.

The transmission threshold value control/transmission controller 240 controls the transmission threshold value variably, as follows. That is, when the network ID from the demodulator 220 matches with the network ID representing a network belonging to a local communication apparatus, the transmission threshold value control/transmission controller 240 varies its transmission threshold value. When the measured received power value is larger than the transmission threshold value held in the transmission threshold value register 250, the transmission threshold value is increased by a fixed value. When the measured received power value is smaller than the transmission threshold value, the transmission threshold value is set to be equal to the measured received power value.

As described above, the communication apparatus shown in FIG. 8 operates in such a way that a transmission threshold value is set to the minimum received power of a signal coming from the network or cell belonging to the concerned communication apparatus. Even if the signal is received from a radio communication apparatus belonging to a cell except cells belonging to the concerned radio communication apparatus, the transmission threshold value is not adjusted. For that reason, the received powers of received signals from a large number of radio communication apparatuses belonging to cells around the cell belonging to the local radio communication apparatus are less than the transmission threshold value. That is, radio communication apparatuses belonging to the same cell mediate to each other for transmission. However, such transmission regulation is not carried out between radio communication apparatuses belonging to different cells. Therefore, the phenomenon can be prevented that radio communication apparatuses belonging to different cells, between which mutual communications are riot required, may excessively suppress their transmission to each other.

The conventional threshold value control method described in the patent document 2 will be explained here. The threshold value control method, which is applied to communication apparatuses in radio LANs, controls variably the carrier detection threshold value to defer the transmission when the received signal has a received power higher than the carrier detection threshold value.

In the threshold value control method, the first radio communication apparatus first receives signals transmitted almost simultaneously from the second radio communication apparatus and the third radio communication apparatus. In this case, the distance between the first radio communication apparatus and the third radio communication apparatus is larger than the distance between the first radio communication apparatus and the second communication apparatus. If signals from the second communication apparatus can be decoded better, the first radio communication apparatus increases the carrier detection threshold value. If signals from the second communication apparatus cannot be decoded better, the first radio communication apparatus decreases the carrier detection threshold value.

Accordingly, when receiving the signal transmitted from a radio communication apparatus within the range where received signals can be better decoded, the first communication apparatus defers its transmission operation. It is prevented that the first communication apparatus defers its transmission because of reception of signals from a radio communication apparatus outside the decodable range.

[Patent Document 1]
JP-P1994-029981A (refer to pages 3 to 6 and FIGS. 3 to 14)

[Patent Document 2]
JP-P2001-217848A (refer to page 8 and FIGS. 12 and 13)

Wide area deployment in the so-called small zone scheme, where plural base stations or access points (APs) are deployed to provide a wide service area and this is the so-called small zone scheme, is performed. In this case, cells overlapped cause each radio communication apparatus to receive signals from cells belonging thereto as well as many signals from other cells. Hence, when the communication apparatus shown in FIG. 7 is used for each radio communication apparatus employing the small zone scheme, transmission suppression frequently occurs in each communication apparatus, so that a large decrease in throughput arises. On the other hand, the communication apparatus shown in FIG. 8 may be used to each radio communication machine employing the small zone scheme. In such a case, because each communication apparatus implements transmission suppression against interference only within the cells belonging to itself but does not sense interference signals from other cells, it can be avoided to suppress transmission excessively as degree as that of the communication apparatus shown in FIG. 7.

In the use of the communication apparatus shown in FIG. 8, communication apparatuses belonging to different cells do not make concession to each other in transmission, so that the frequency of generation of transmission suppression in each communication apparatus can be decreased. However, even in that case, there is the problem that transmission is excessively suppressed in a radio link within a cell. The problem will be explained below.

The radio link between the first mobile terminal being a communication apparatus located inside a cell and an access point (AP) being a communication apparatus configuring the cell has a propagation loss lower than the radio link between the second mobile terminal being a communication apparatus located outside the cell and the AP. Therefore, the radio link between the first mobile terminal and the AP indicates a higher interference immunity than the radio link between the second mobile terminal and the AP. As a result, the carrier detection threshold value of the first mobile terminal can be set to a higher value than the carrier detection threshold value of the second mobile terminal.

However, in the communication apparatus shown in FIG. 8, a carrier detection threshold value is a fixed value. That is, the carrier detection threshold values of the first and the second mobile terminals are set to the same value. Hence, the problem is that transmission is excessively suppressed even in the radio link having a high interference resistance within cells. Similarly, the communication apparatus shown in FIG. 7 has the above-mentioned problem.

As described above, the threshold value control method described in the patent document 2 can avoid the problem that transmission is deferred because of reception of signals from a communication apparatus outside the range where the communication apparatus can better duplex received signals. Therefore, the frequency of generation of transmission suppression can be reduced. However, the threshold value control method has the above-mentioned problem. That is, even when a communication apparatus transmits signals via a radio link having a higher interference resistance, transmission is delayed if signals from communication apparatuses within the range are received.

SUMMARY OF THE INVENTION

An objective of the invention is to provide communication apparatuses in radio networks, transmission control methods, threshold value control methods, programs, and radio network systems, which can avoid excessive transmission control on a radio link with small propagation loss and with high interference resistance.

According to the present invention, a communication apparatus in a radio network, wherein transmission of a transmission signal is deferred or ceased when a received power of a received signal exceeds a threshold value, comprises threshold value control means for determining the threshold value in accordance with a radio line quality between a transmission destination of the transmission signal and the communication apparatus.

In the communication apparatus, the radio line quality between the transmission destination of the transmission signal and the communication apparatus comprises the received power of a received signal from the transmission destination.

In the communication apparatus, when receiving a signal, the threshold value control means records transmission source information on the received signal and a threshold value corresponding to the received power of the received signal in one-to-one correspondence.

In the communication apparatus, the threshold value control means has a threshold value table that records transmission source information on received signals and threshold values corresponding to received powers of the received signals in one-to-one correspondence, and extracts a threshold value corresponding to the transmission destination from the threshold value table to decide whether or not transmission of the transmission signal is deferred or ceased.

In the communication apparatus, when both transmission source information on a received signal and a threshold value (hereinafter referred to as a second value) corresponding to the received power of the received signal are recorded on the threshold value table, if the transmission source information already exists in the threshold value table, the threshold value control means rewrites a threshold value (referred to as a first value) already recorded on the threshold value table and corresponding to the transmission source information into a value obtained by weight adding the first value and the second value.

In the communication apparatus, when transmission source information on a received signal and a threshold value (hereinafter referred to as a second value) corresponding to the received power of the received signal are recorded on the threshold value table, if the transmission source information already exists in the threshold value table, the threshold value control means compares a threshold value being always recorded corresponding to the transmission source information on the threshold value table (hereinafter referred to as a first value) with the second value, and then rewrites the first value into the second value only when the second value is smaller than the first value.

In the communication apparatus, when the transmission signal is a signal to be broadcast, a value (=a minimum value of threshold values recorded on the threshold value table or a noise power level of the communication apparatus+a predetermined SN ratio (signal-to-noise ratio)) is used instead of a threshold value determined in accordance with the received power of a received signal from the transmission destination.

In the communication apparatus, when the transmission signal does not exist, a value (=a noise power level of the communication apparatus+a predetermined SN ratio (signal-to-noise ratio)) is used instead of a threshold value determined in accordance with the received power of a received signal from the transmission destination. The communication apparatus comprises an access point or a mobile station.

According to the present invention, a transmission control method for a communication apparatus in a radio network, comprises a threshold value control step for determining a threshold value in accordance with a radio line quality between a transmission destination of a transmission signal and the communication apparatus, the threshold value being used to decide whether or not transmission of the transmission signal is deferred or ceased; and a transmission control step for deferring or ceasing transmission of the transmission signal when a signal, which has a received power exceeding the threshold value determined in the threshold value control step, is received.

According to the present invention, a program by which a computer executes a transmission control method for a communication apparatus in a radio network, comprises a threshold value control step for determining a threshold value in accordance with the radio line quality between a transmission destination of a transmission signal and the communication apparatus; and a transmission control step for deferring or ceasing transmission of the transmission signal when a signal, which has a received power exceeding the threshold value determined in the threshold value control step, is received.

According to the present invention, a threshold value control method for a communication apparatus in a radio network, wherein transmission of a transmission signal is deferred or ceased when a received power of a received signal exceeds a threshold value, comprises the step of variably controlling the threshold value in accordance with a radio line quality between a transmission destination of the transmission signal and the communication apparatus.

According to the present invention, a program by which a computer executes a threshold value control method for a communication apparatus in a radio network, wherein transmission of a transmission signal is deferred or ceased when a received power of a received signal exceeds a threshold value, comprises the step of variably controlling the threshold value in accordance with a radio line quality between a transmission destination of the transmission signal and the communication apparatus.

According to the present invention, a radio network system configured of plural communication apparatuses, wherein transmission of a transmission signal is deferred or ceased when a received power of a received signal exceeds a threshold value, each of the plural communication apparatuses comprises threshold value control means for determining the threshold value in accordance with a radio line quality between a transmission destination of the transmission signal and the communication apparatuses.

With the high quality of a radio line between a radio transmitter and a radio receiver, the receiver can better receive signals from the corresponding transmitter even if the corresponding transmitter and other radio transmitters transmit signals nearly at the same time. In the communication apparatus in a radio network according to the present invention, the threshold value control means determines the threshold value according to the radio line quality between a transmission destination, to which transmission signals are transmitted, and the communication apparatus itself. When a signal having a received power exceeding a determined threshold value is received, the transmission of the transmission signal is deferred or ceased. Is not so, the transmission signal is transmitted.

Thus, the higher the radio line quantity is, the larger the threshold value is set. It can be avoid that transmission is excessively suppressed in a radio link having a higher quality.

BRIEF DESCRIPTION OF THE DRAWINGS

This and other objects, features and advantages of the present invention will become more apparent upon a reading of the following detailed description and drawings, in which:

FIG. 3 is a diagram showing an example of a threshold value reference table stored in the threshold value reference table register 7 shown in FIG. 2;

DESCRIPTION OF THE EMBODIMENTS

Embodiments of the present invention will be described in detail below with reference to the attached drawings.

Figure 1:
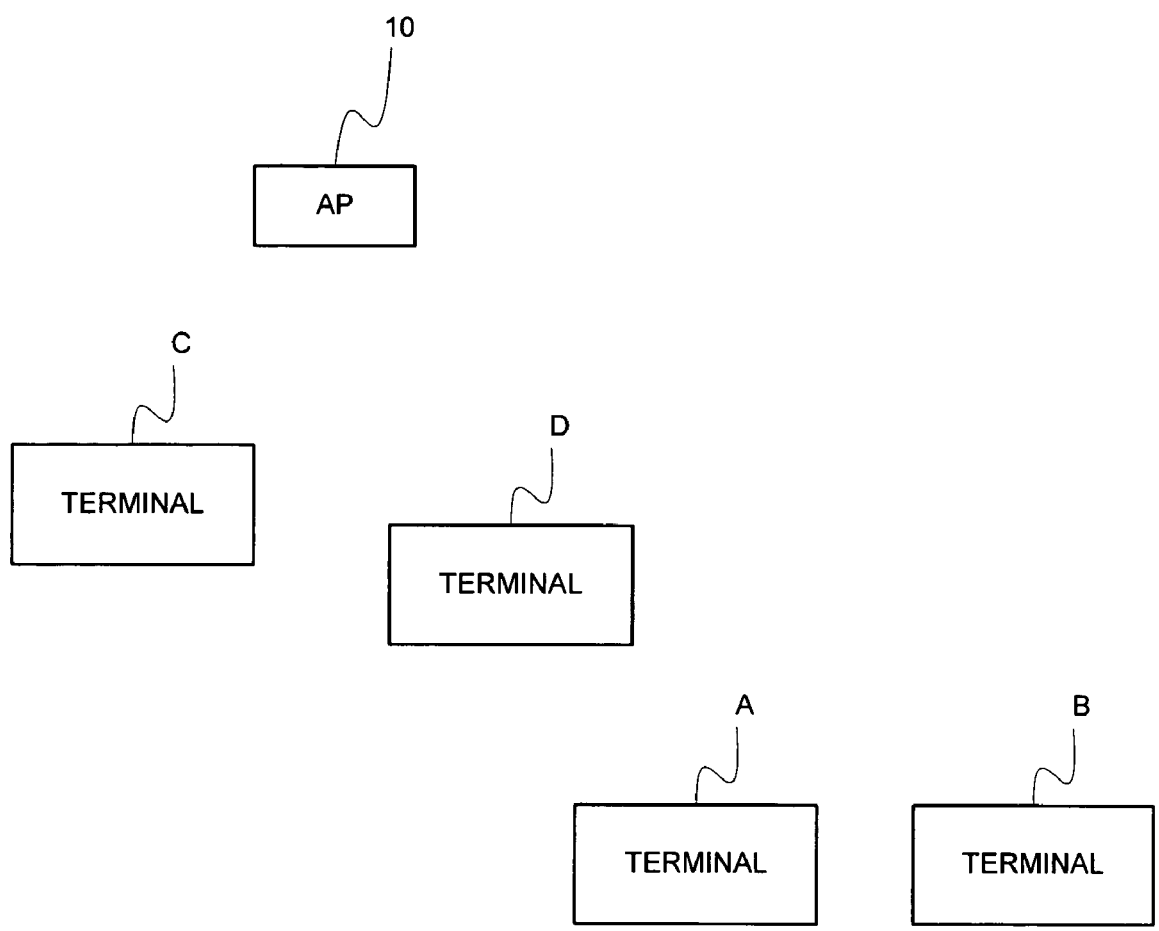
FIG. 1 is a diagram illustrating the configuration of a radio LAN system according to a first embodiment of the present invention.

FIG. 1 is a diagram illustrating the configuration of a radio LAN (Local Area Network) system according to the first embodiment of the present invention. As shown in FIG. 1, the radio LAN system in the first embodiment includes an access point 10 and mobile terminals (mobile stations) A to D. In the first embodiment of the present invention, each of the mobile terminals A to D can communicate wirelessly with the access point 10 and with other mobile terminals via the access point 10.

Figure 2:
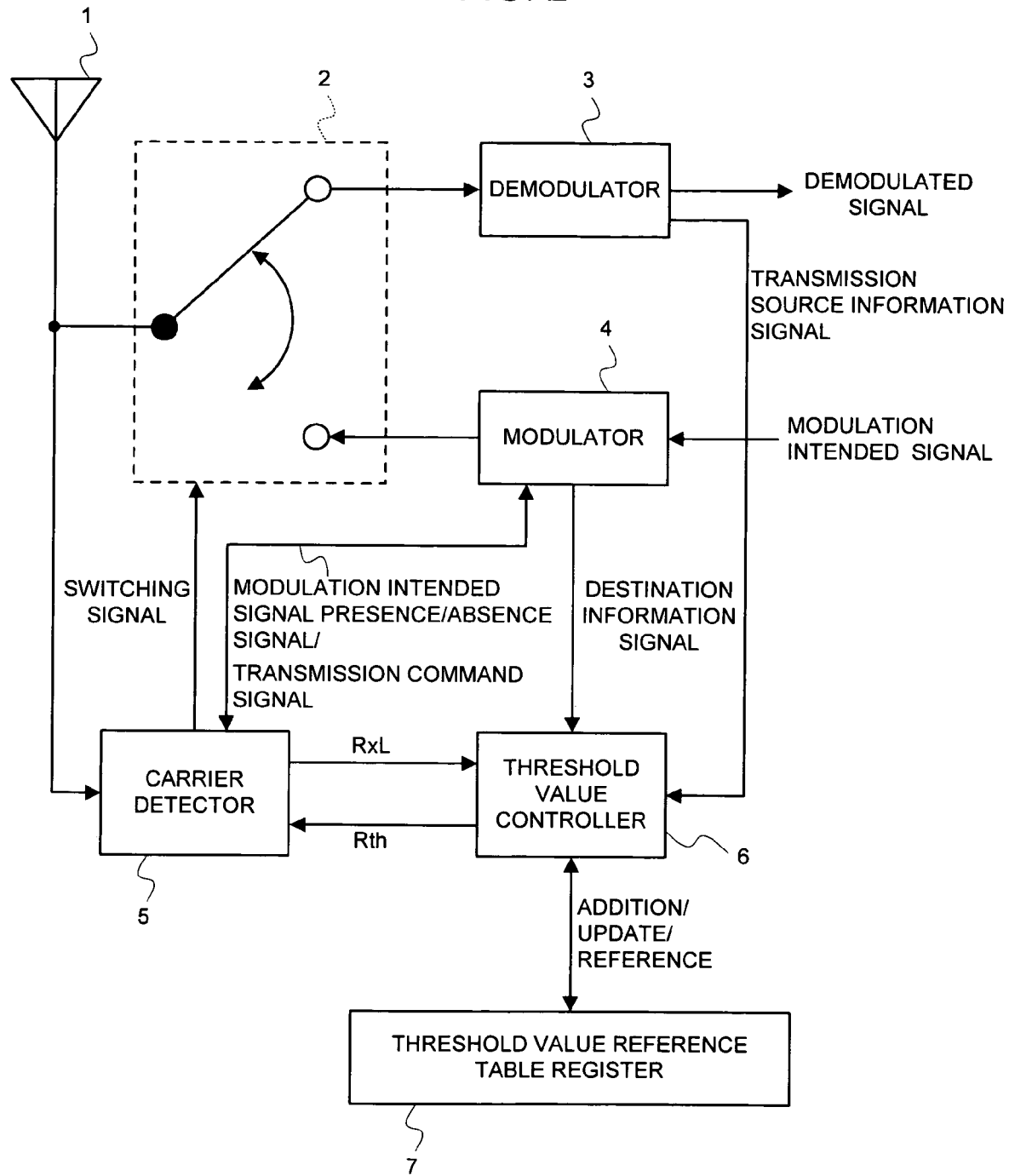
FIG. 2 is a diagram illustrating the configuration of the access point 10 of FIG. 1.

FIG. 2 is a diagram illustrating the configuration of the access point 10 shown in FIG. 1. As shown in FIG. 2, the access point 10 includes an antenna 1, a switch 2, a demodulator 3, a modulator 4, a carrier detector 5, a threshold value controller 6, and a threshold value reference table register 7. The switch 2, which is controlled by the carrier detector 5, selects the demodulator 3 or the modulator 4 according to the switching signal from the carrier detector 5.

The switch 2 and the carrier detector 4 receive signals from the antenna 1. The carrier detector 5 measures the received power of the received signal. The carrier detector 5 outputs the measured received power value R×L to the threshold value controller 6 and compares the carrier detection threshold value Rth notified by the threshold value controller 6 with the measured received power value R×L.

If the measured received power value R×L is larger than the threshold value Rth, or a modulation intended signal (a transmission signal to be transmitted) during a transmission waiting state does not exist, the carrier detector 5 controls the switch 2 to connect the demodulator 3 to the antenna 1. If not so, the carrier detector 5 controls the switch 2 to connect the modulator 4 to the antenna 1 after waiting for a random time and indicates transmission of the modulation intended signal to the modulator 4, using the transmission indication signal. The modulator 4 notifies the carrier detector 5 of the presence or absence of the modulation intended signal, using the modulation intended signal presence/absence signal.

The modulator 4 has a buffer (not shown). It is assumed that, in spite of a transmission packet (or a transmission signal) input to the modulator 4, the switch 2 selects the modulator 3 and the carrier detector 5 does not indicate transmission of the transmission packet. In such a case, the modulator 4 stores the transmission packet in the buffer. The switch 2 selects the selector 4 and the carrier detector 5 indicates transmission of the carrier detector 5. Thus, the modulator 4 modulates the transmission packet within the buffer and then transmits the modulated signal to the transmission destination via the antenna 1. Alternatively, the transmission signal of low priority may be discarded without being stored in the buffer.

When the buffer has a transmission packet to be transmitted, the modulator 4 notifies the threshold value controller 6 of a destination address (transmission destination address) (being destination address information included in the transmission packet) using the destination address information signal. The threshold value controller 6 sets the carrier detection threshold value Rth based on the address notified by the modulator 4 and then sends it to the carrier detector 5. A destination address included in a transmission packet may be an address indicating each communication apparatus or addresses indicating all communication apparatuses (that is, an address defined as a broadcast address).

When there are no transmission packets in the buffer within the modulator 4, the carrier detector 5 controls the switch 2 in such a way that the switch 2 selects the demodulator 3. However, there are no transmission packets, the threshold value controller 6 outputs the minimum value Rmin (acting as a carrier detection threshold value Rth) to the carrier detector 5. The carrier detector 5 may control the switch 2 to select the demodulator 3 only when the signal having the received power exceeding the minimum value Rmin is received. The minimum value Rmin is a value obtained by adding a predetermined SN ratio (Signal-to-Noise ratio) to a noise power level inherent to the access point 10. The noise power level is a value determined inherently every communication apparatus. With no transmission packets, it is considered that the minimum value Rmin is set to the carrier detection threshold value Rth because the received signal of received power less than the minimum value Rmin cannot be better decoded.

Values set as carrier detection threshold values Rth set by each threshold value controller 6 and addresses representing the mobile terminals A to D are recorded in one-to-one correspondence on the threshold value reference table within the threshold value reference table register 7. When receiving destination information signal from the modulator 4, the threshold value controller 6 sets as the carrier detection threshold value Rth the value corresponding to the address notified from the modulator 4 of values recorded on the threshold value reference table.

FIG. 3 is a diagram showing an example of the threshold value reference table. Referring to FIG. 3, the address of the mobile terminal A is "A" and the address of the mobile terminal B is "B" and the address of the mobile terminal C is "C" and the address of the mobile terminal D is "D". The value corresponding to the address of the mobile terminal A is "−74 dBm" and the value corresponding to the address of the mobile terminal B is "80 dBm" and the value corresponding to the address of the mobile terminal C is "−22 dBm" and the value corresponding to the address of the mobile terminal D is "−43 dBm". As shown in FIG. 3, values set as respective carrier detection threshold values Rth and addresses are recorded in one-to-one correspondence on the threshold value reference table.

When the address notified from the modulator 4 is, for example, "A", or when a destination of a transmission packet to be transmitted is the mobile terminal A, "−74 dBm", being a corresponding value, is set as the carrier detection threshold value Rth. Hence, the carrier detector 5 compares the received power of a received signal with the carrier detection threshold value of −74 dBm and thus decides whether or not to defer transmission of the transmission packet to be transmitted to the mobile terminal A.

When the threshold value reference table includes no entry of an address notified from the modulator 4, or when a destination address included in a transmission packet to be transmitted and a value corresponding to the address is not recorded on the threshold value reference table, the threshold value controller 6 outputs the minimum value Rmin as a carrier detection threshold value Rth to the carrier detector 5. If the address notified from the modulator 4 is a broadcast address, the threshold value controller 6 outputs as a carrier detection threshold value Rth the minimum value Rmin or the minimum value of values recorded on the threshold value reference table, to the carrier detector 5.

When receiving a received signal via the switch 2, the demodulator 3 demodulates it and then outputs the demodulated signal to a circuit (not shown). Meanwhile, the demodulator 3 sends the transmission source address being transmission source information included in the demodulated signal to the threshold value controller 6 using the transmission source information signal.

Every time a transmission source address included in a received signal from the demodulator 3 is notified, the threshold value controller 6 updates the threshold value reference table. If the threshold value reference table does not yet include any entry corresponding to the address notified from the demodulator 3, or does not have the transmission source address included in a received signal and a value corresponding to the address, the threshold value controller 6 newly creates the entry corresponding to the address on the threshold value reference table. Thus, the received power value RxL notified from the carrier detector 5, which is the received power value of the received signal, or the value obtained by decreasing the received power value RxL by a predetermined value is set as a value corresponding to the address.

On the other hand, When the threshold value reference table already includes the transmission source address included in a received signal and a value corresponding to the address, the threshold value controller 6 updates the value corresponding to the address using any one of the following first to third updating methods.

In the first updating method, when the threshold value reference table already includes the transmission source address included in a received signal and a value corresponding to the address, the corresponding value already recorded is rewritten into the received power value RxL of the received signal (a current received power value) or into a value obtained by decreasing the received power value RxL by a predetermined value. The propagation loss between radio communication apparatuses changes dynamically. However, the first updating method can always set the carrier detection threshold value Rth based on the latest received power.

In the second updating method, when the threshold value reference table already includes the transmission source address included in a received signal and the value corresponding to the address, the corresponding value already recorded is averaged using the received power value RxL of the received signal (a current received power value) or a value obtained decreasing the received power value RxL by a predetermined value. The second updating method is realized by using, for example, the following equation (1).

$$Tu = Tp*a + RxL*(1-a) \qquad (1)$$

where Tu represents a corresponding value after updating; Tp represents a corresponding value before updating; and a represents a weight coefficient. The weight coefficient (a) is usually defined by a real number of 0 or 1. The weight coefficient (a) is set using, for example, the following equation (2).

$$a = n/(n+1) \qquad (2)$$

where n represents number of times of updating a corresponding value to be updated. The second updating method can smooth a received power to a suitable value when the received power changes abruptly.

In the third updating method, when the threshold value reference table already includes the transmission source address included in a received signal and the value corresponding to the address, the corresponding value already recorded is compared with the received power value RxL of the received signal, being a current received power value, (or a value obtained by decreasing the received power value RxL by a predetermined value). Then, only when the latter is lower than the former, the corresponding value already recorded is rewritten into the received power value RxL (or a value obtained by decreasing the received power value RxL by a predetermined value). In the third updating method, the carrier detection threshold value Rth can be set to a suitable value in the condition where, for example, radio communication apparatuses recede from each other at a faster rate.

Figure 4:
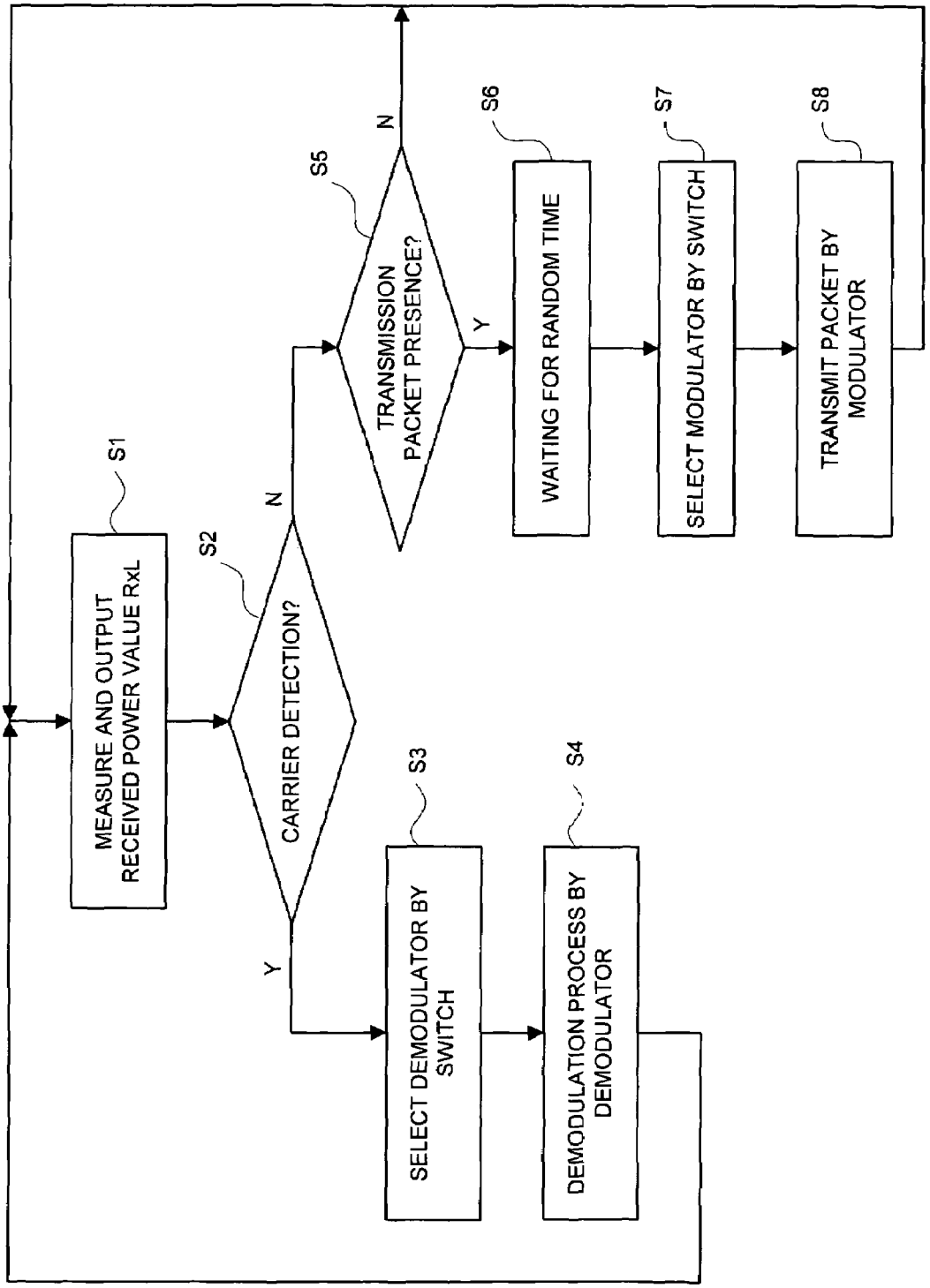
FIG. 4 is a flowchart illustrating the operation of the carrier detector 5 shown in FIG. 2.
Figure 5:
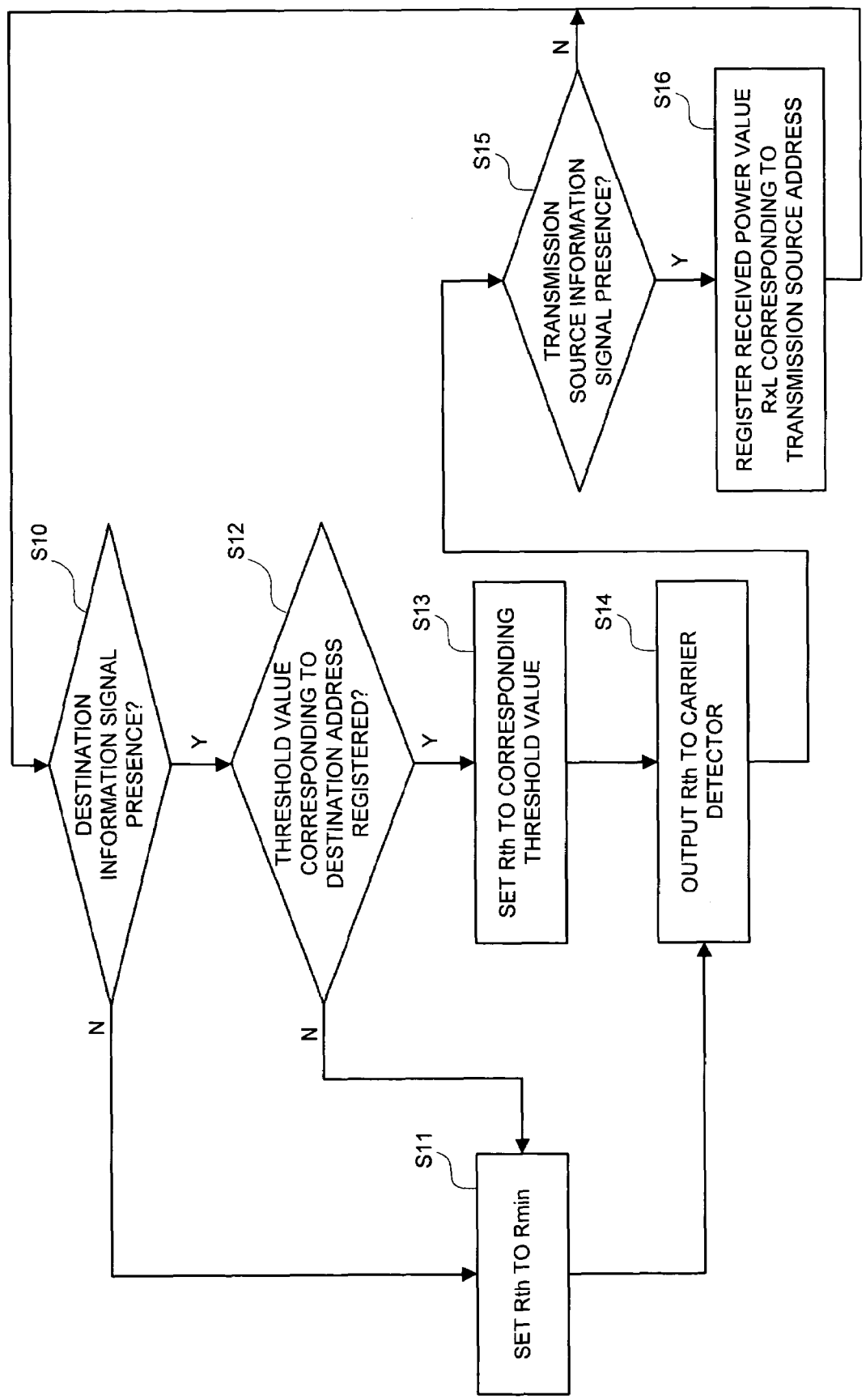
FIG. 5 is a flowchart illustrating the operation of the threshold value controller 6 of FIG. 2.

The operation of the access point 10 shown in FIG. 1 and FIG. 2 will be explained below by referring to FIG. 4 and FIG. 5. FIG. 4 is a flowchart showing the operation of the carrier detector 5 shown in FIG. 2. FIG. 5 is a flowchart showing the operation of the threshold value controller 6 shown in FIG. 2.

The operation of the carrier detector 5 will be explained by referring to FIG. 4. The carrier detector 5 measures the received power value RxL of a received signal and then outputs it to the threshold value controller 6 (step S1 in FIG. 4). The carrier detector 5 compares the received power value RxL with the carrier detection threshold value Rth notified from the threshold value controller 6 in the step S14 shown in FIG. 5 (step S2 in FIG. 4).

If the received power value RxL is larger than the carrier detection threshold value Rth (Yes, in the step S2 in FIG. 4), the carrier detector 5 controls the switch 2 to select the demodulator 3. Therefore, the demodulator 3 is connected to the antenna 1 via the switch 2 (step S3 in FIG. 4) and the demodulator 3 demodulates the received signal (step S4 in FIG. 4).

If the received power value RxL is less than the carrier detection threshold value Rth (No, in the step S2 in FIG. 4)

and there is a transmission packet to be transmitted (Yes, in the step S5 in FIG. 4), the carrier detector 5 controls the modulator 4 to select the switch 2 after waiting for a random time and indicate the modulator 4 to transmit the transmission packet. Therefore, the modulator 4 is connected to the antenna 1 via the switch 2 (step S7 in FIG. 4) to transmit the transmission packet (step S8 in FIG. 4).

If the received power value R×L is less than the carrier detection threshold value Rth (No, in the step S2 in FIG. 4) and there is no transmission packet to be transmitted (No, in the step S5 in FIG. 4), the flow goes back to the step S1.

Next, the operation of the threshold value controller 6, that is, the threshold value control method of the first embodiment will be explained below by referring to FIG. 5. When a destination address included in a transmission packet to be transmitted is notified from the modulator 4 (Yes, in the step S10 in FIG. 5), the threshold value controller 6 confirms whether or not the threshold value reference table register 7 includes a value corresponding to the address registered on the threshold value reference table (step S12 in FIG. 5).

If the value corresponding to the address is in a registered state (Yes, in the step S12 in FIG. 5), the threshold value controller 6 sets the carrier detection threshold value Rth to a value corresponding to the address (step S13 in FIG. 5) and then outputs the set carrier detection threshold value Rth to the carrier detector 5 (step S14 in FIG. 5).

If the value corresponding to the address is not in a registered state (No, in the step S12 in FIG. 5), the threshold value controller 6 sets the carrier detection threshold value Rth to the minimum value Rmin (step S11 in FIG. 5) and then outputs the set carrier detection threshold value Rth to the carrier detector 5 (step S14 in FIG. 5).

When a destination address is not notified from the modulator 4, that is, there is no transmission packet to be transmitted (No, in the step S10 in FIG. 5), the threshold value controller 6 sets the carrier detection threshold value Rth to the minimum value Rmin (step S11 in FIG. 5) and then outputs the set carrier detection threshold value Rth to the carrier detector 5 (step S14 in FIG. 5).

In the step S15 following the step S14, when a transmission source address included in a received signal is notified from the demodulator 3 (Yes, in the step S15 in FIG. 5), the threshold value controller 6 registers the address and the received power value R×L of the received signal notified from the carrier detector 5 in the step S1 shown in FIG. 4 on the threshold value reference table in one-to-one correspondence (step S16 in FIG. 5).

When the address (not shown in FIG. 5) notified in the step S10 in FIG. 5 is a broadcast address, the threshold value controller 6 sets the carrier detection threshold value Rth to either the minimum value Rmin or the minimum value of corresponding values registered on the threshold value reference table.

Similarly, when an entry (not shown in FIG. 5) to the address notified in the step S15 in FIG. 5 is already on the threshold value reference table, the threshold value controller 6 updates the value corresponding to the address according to any one of the first to third updating methods, in the step S16 of FIG. 5.

When there is no transmission packet to be transmitted in the step S10 of FIG. 5 (No, in the step S10 in FIG. 5), the threshold value controller 6 sets the carrier detection threshold value Rth to the minimum value Rmin (step S11 in FIG. 5) and then outputs it (step S14 in FIG. 5). However, in this case, that process may be changed to the process in the step S15 without performing the processes in the steps S11 and S14. As described above, the processes in the steps S11 and S14 are omitted. In such a case, when the buffer in the modulator 4 does not hold any transmission packet in the step S5 shown in FIG. 4, the carrier detector 5 controls the switch 2 to connect the demodulator 3 to the antenna 1.

In order to realize the process operations of the flowcharts shown respectively in FIGS. 4 and 5, a computer being a CPU (or a control section) reads a program previously stored in a memory medium such as a ROM.

As described above, in the first embodiment of the present invention, the AP 10 varies the carrier detection threshold value Rth every transmission packet to be transmitted. A threshold value reference table records the received power value of a packet previously received from a mobile terminal to which the transmission packet is transmitted. The AP 10 sets the received power value as the carrier detection threshold value Rth.

In other words, the smaller the propagation loss of a radio link between the AP 10 and a mobile terminal to which a transmission packet is to be transmitted is, the higher the carrier detection threshold value Rth is set. With a small amount of propagation loss, the mobile terminal being a transmission packet receiving side can secure a high received power of a desired signal. Therefore, even if a large value is set as a carrier detection threshold value Rth, the AP 10 can obtain a desired communication quality.

When a large value is set as the carrier detection threshold value Rth, the frequency of occurrence of transmission suppression in the AP 10 is reduced, so that the throughput increases in many cases. Generally, a shorter distance between radio communication apparatuses leads to decreasing the propagation loss of the radio link therebetween. Therefore, it is considered that a shorter distance between the AP 10 and a mobile terminal to which a transmission packet is transmitted results in an improved throughput.

When a large value is set as the carrier detection threshold value Rth, concern is that the switch 2 may select only the modulator 4, so that the process of demodulating important packets transmitted to the AP 10 is not performed. However, in the first embodiment of the present invention, when transmission packets to be transmitted in the AP 10 do not exist, the demodulator 3 is selected at all times or the carrier detection threshold value Rth is set to the minimum value Rmin. In this situation, the above-mentioned problem does not occur.

When a transmission packet to be transmitted exists, the above-mentioned problem becomes obvious. Because the main communication opposite party of the AP 10 is a mobile terminal to which a transmission packet is to be transmitted, it is considered that the probability that packets are sent from radio communication apparatuses, except the mobile terminal to which the transmission packet is transmitted, to the AP 10 is low. When a packet arrives from a mobile terminal to which the transmission packet is transmitted, the carrier detector 5 is detected almost certainly, so that the above-mentioned problem does not occur. As to the feature of the present invention, such an operation can be avoided that transmission is excessively suppressed in a radio link having a high interference resistance, which is the problem in both the conventional radio communication apparatus and the conventional threshold value control method. Thus, transmission is performed positively as much as possible.

Next, the second embodiment of the present invention will be explained below. In the first embodiment of the present invention, only the AP 10 varies the carrier detection threshold value Rth used to decide whether or not its transmission is deferred. However, in the second embodiment of the present invention, each mobile terminal varies the carrier detection threshold value Rth used to decide whether or not its transmission is deferred.

Figure 6:
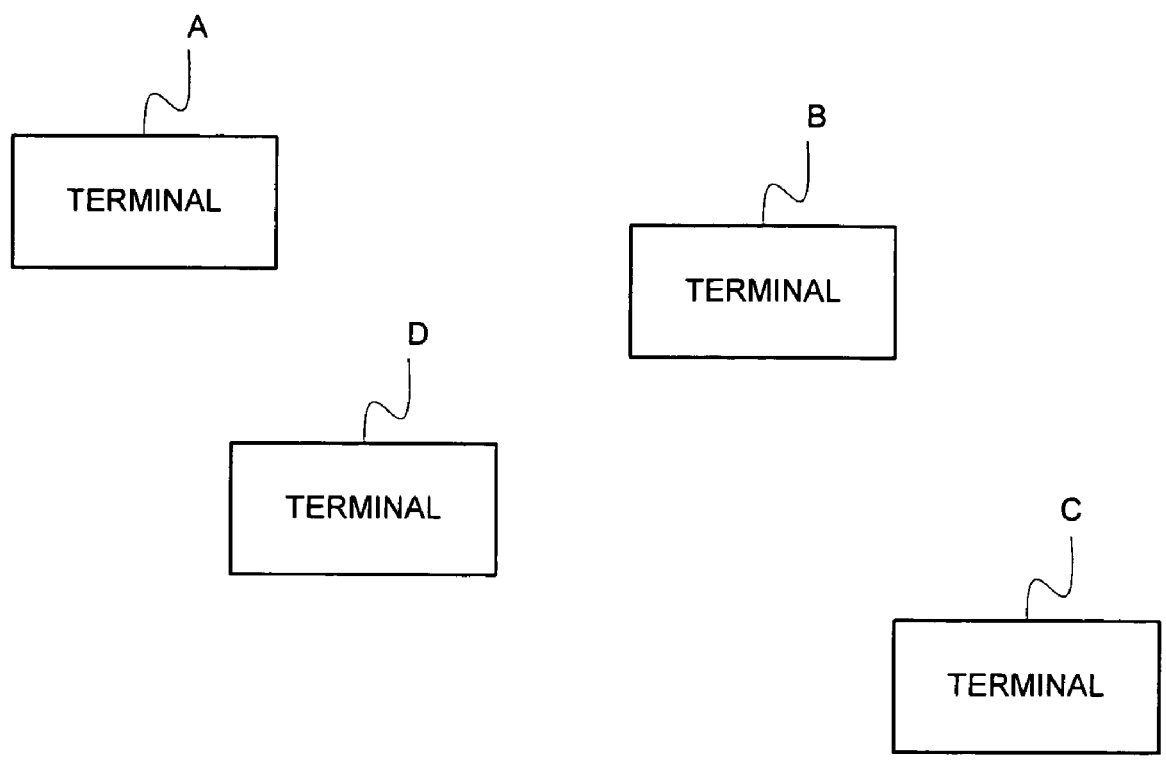
FIG. 6 is a diagram illustrating the configuration of a radio LAN system according to a second embodiment of the present invention.
Figure 7:
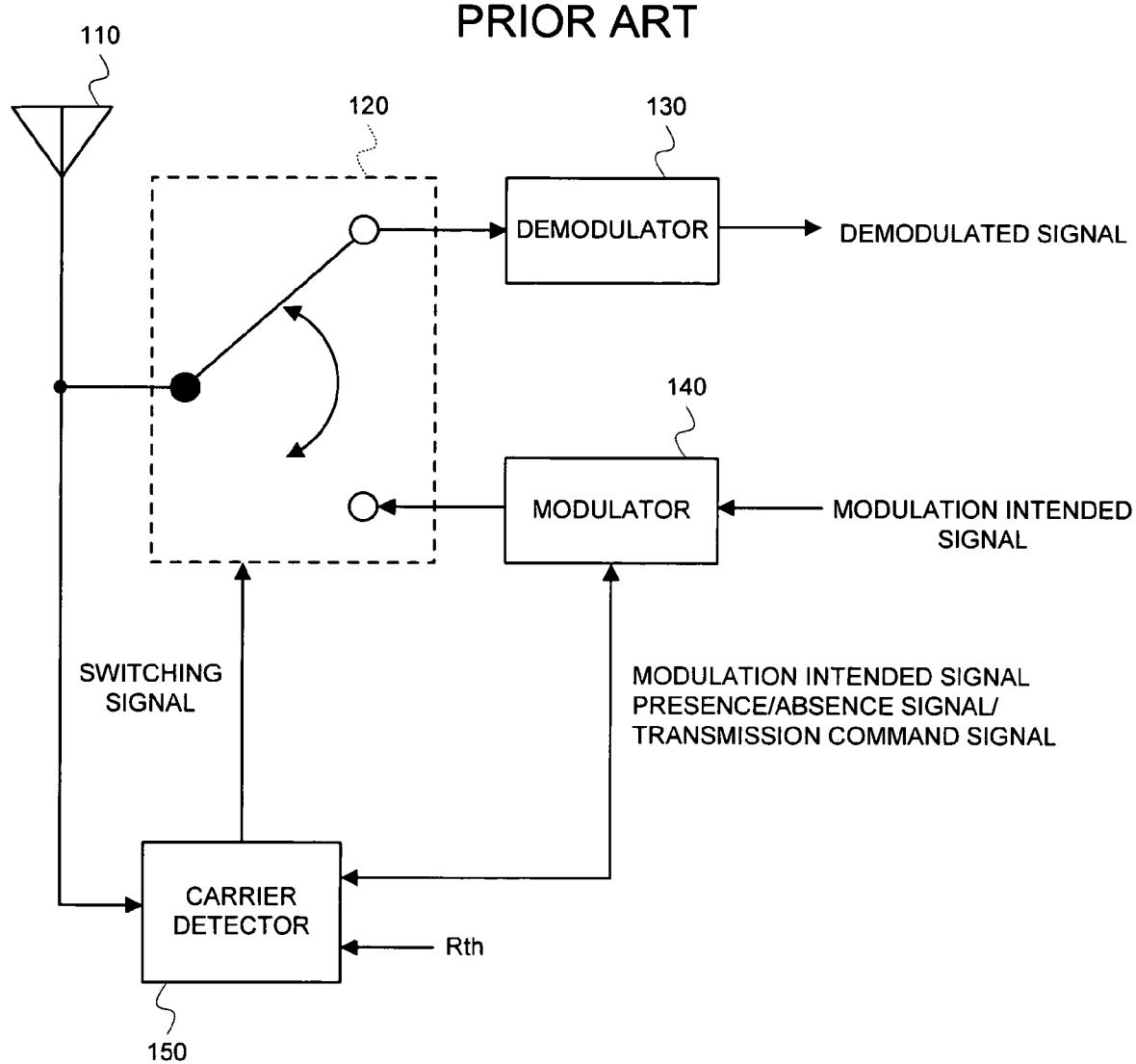
FIG. 7 is a diagram illustrating the configuration of conventional radio communication apparatus.
Figure 8:
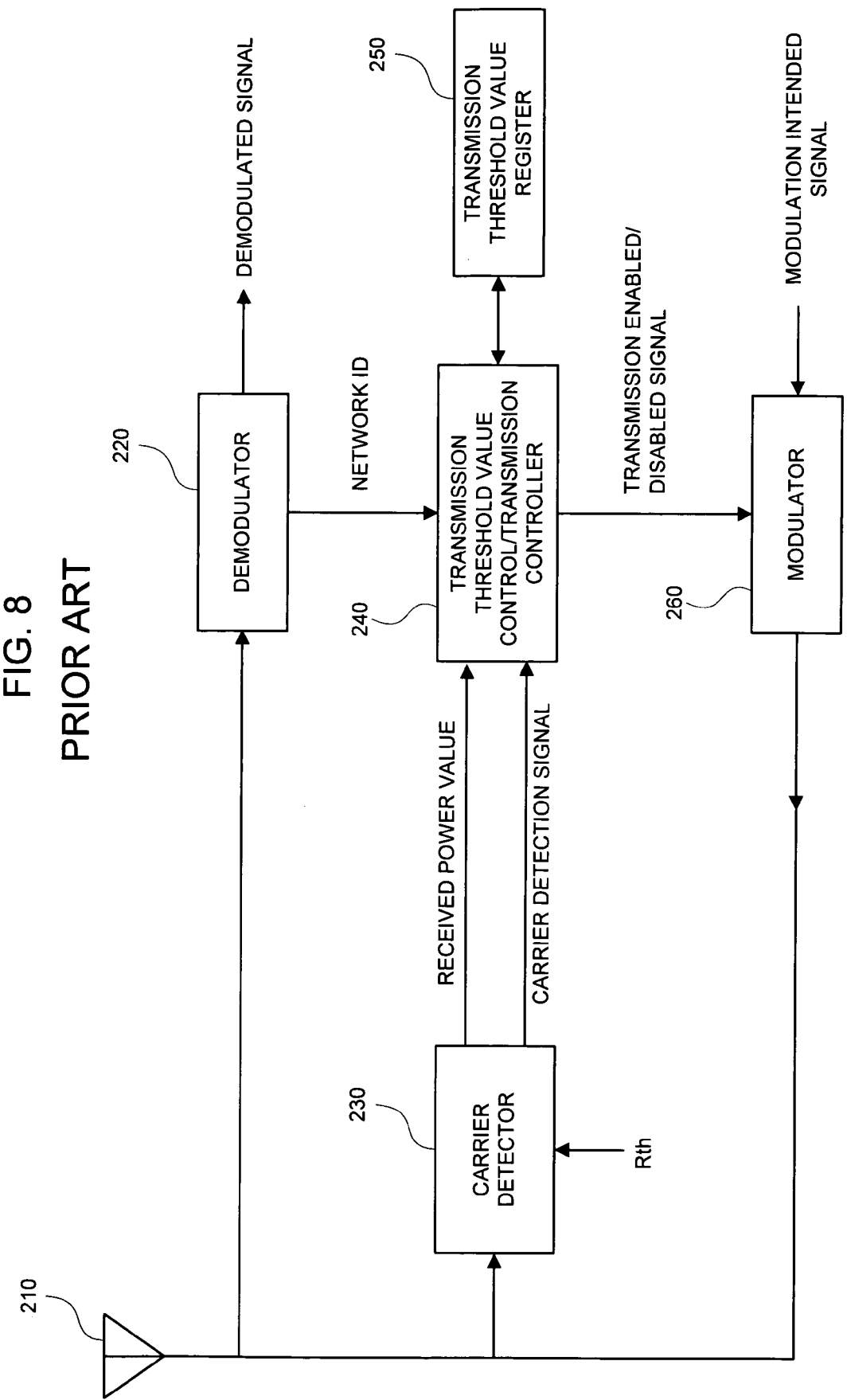
FIG. 8 is a diagram illustrating the configuration of another conventional radio communication apparatus.

FIG. 6 is a diagram illustrating the configuration of a radio LAN (Local Area Network) system according to the second embodiment of the present invention. As shown in FIG. 6, the radio LAN system in the second embodiment includes mobile terminals (mobile stations) A to D. In the second embodiment of the present invention, each of the mobile terminals A to D can be wirelessly communicate directly to other mobile terminals without relaying through the access point.

Each of the configurations of the mobile terminals A to D shown in FIG. 6 is similar to that of the access point 10 shown in FIG. 2 and the operation thereof is similar to the access point 10. Therefore, according to the positional relationships between the mobile terminals A to D shown in FIG. 6, when a transmission destination for a transmission packet to be transmitted by the mobile terminal A is the mobile terminal C, the carrier detection threshold value Rth of the mobile terminal A is set to a value smaller than the carrier detection threshold value Rth of the mobile terminal B being a transmission destination to which the transmission packet is transmitted. The carrier detection threshold value Rth of the mobile terminal D, being a transmission packet transmission destination, is set to a value larger than the carrier detection threshold value Rth of the mobile terminal B, being a transmission packet transmission destination.

As described above, when a destination to which a transmission packet is transmitted is the mobile terminal D, that is, when the mobile terminal A transmits the transmission packet is transmitted via a radio link having higher interference-resistant characteristics, the priority of the transmission is set to a value higher than the priority of the transmission to the mobile terminal B or the mobile terminal C. Accordingly, the excessive transmission suppression can be avoided in the radio link having high interference-resistant characteristics.

As described above, each of the mobile terminals A to D shown in FIG. 6 employs a method similar to the threshold value control method according to the first embodiment of the present invention. Accordingly, each of the mobile terminals A to D shown in FIG. 1 may implement a method similar to the threshold value control method in the first embodiment of the present invention.

In other words, each of the mobile terminals A to D shown in FIG. 1 may have a configuration similar to the configuration of the access point 10 shown in FIG. 2 and may perform an operation similar to the operation of the access point 10.

In the radio LAN system shown in FIG. 1, let now us consider that the mobile terminal C, for example, receives the packet transmitted from the mobile terminal B via the access point 10. In this case, the mobile terminal C does not record the received power value of the received packet on its threshold value reference table in correspondence with the address of the mobile terminal B. Instead, the mobile terminal C records the received power value of the received packet on its threshold value reference table in correspondence with the address of the access point 10. That is, when receiving a packet, each of the mobile terminals A to D shown in FIG. 1 recognizes the radio communication apparatus directly connected to a radio link which has received the received packet, as a source transmitting the received packet and records the received power value of the received packet as a value corresponding to the address of the transmission source on its threshold value reference table.

In the radio LAN system shown in FIG. 1, let us now consider that the mobile terminal C, for example, transmits packets to the mobile terminal B via the access point 10. In this case, the mobile terminal C sets its carrier detection threshold value Rth to a value corresponding to the address of the access point 10, not to the value corresponding to the address of the mobile terminal B. In other words, when transmitting a packet, each of the mobile terminals A to D shown in FIG. 1 recognizes as a destination of the transmission packet the radio communication apparatus connected directly by a radio link, which intends to transmit the transmission packet, and then sets its carrier detection threshold value Rth to a value corresponding to the address of the transmission destination.

As described above, each of the mobile terminals A to D and the access point 10, shown in FIG. 1, implement the threshold value control method according to the first embodiment of the present invention. Thus, when each of the communication apparatuses transmits signals via the radio link having a sufficiently high interference immune, it can be avoided that reception of the signal not influenced by the transmission may suppress the transmission.

In the present invention described above, the carrier detection threshold value can be variably controlled according to the radio line quality between a destination to which a transmission signal is be transmitted and a local apparatus. That is, the higher the radio line quality is, the larger the carrier detection threshold value is set. Therefore, excessive transmission suppression can be avoided in the radio link having a high quality.

What is claimed is:

1. A communication apparatus comprising:
a threshold value controller for determining a threshold value based on a radio line quality between a transmission destination of said transmission signal and the communication apparatus; and
a transmission controller for deferring or ceasing transmission of transmission signal when a received power of a received signal exceeds said threshold value,
where when receiving a signal said threshold value controller records in a threshold value table transmission source information on received signals and threshold values corresponding to received powers of said received signals in one-to-one correspondence, and extracts a threshold value corresponding to said transmission destination from said threshold value table to decide whether or not transmission of said transmission signal is deferred or ceased,
wherein, when both transmission source information on a received signal and a second threshold value corresponding to the received power of the received signal are recorded on said threshold value table, if said transmission source information already exists in said threshold value table, said threshold value controller rewrites a first threshold value already recorded on said threshold value table and corresponding to said transmission source information into a value obtained by weight adding said first value and said second value.

2. A communication apparatus comprising:
a threshold value controller for determining a threshold value based on a radio line quality between a transmission destination of said transmission signal and the communication apparatus; and
a transmission controller for deferring or ceasing transmission of transmission signal when a received power of a received signal exceeds said threshold value, where when receiving a signal, said threshold value controller records in a threshold value table transmission source information on received signals and threshold values corresponding to received powers of said received signals in one-to-one correspondence, and extracts a threshold value corresponding to said transmission destination from said threshold value table to decide whether or not transmission of said transmission signal is deferred or ceased, wherein, when transmission source information on a received signal and a second threshold value corresponding to the received power of the received signal are recorded on said threshold value table, if said transmission source information already exists in said threshold value table, said threshold value controller compares a threshold value being always recorded corresponding to said transmission source information on said first threshold value table with said second value, and then rewrites said first value into said second value only when said second value is smaller than said first value.

3. A communication apparatus comprising:

a threshold value controller for determining a threshold value based on a radio line quality between a transmission destination of said transmission signal and the communication apparatus; and a transmission controller for deferring or ceasing transmission of transmission signal when a received power of a received signal exceeds said threshold value, where when receiving a signal, said threshold value controller records in a threshold value table transmission source information on received signals and threshold values corresponding to received powers of said received signals in one-to-one correspondence, and extracts a threshold value corresponding to said transmission destination from said threshold value table to decide whether or not transmission of said transmission signal is deferred or ceased, wherein when said transmission signal is a signal to be broadcast, a value equal to a minimum value of threshold values recorded on said threshold value table or a noise power level of said communication apparatus plus a predetermined signal-to-noise ratio is used instead of a threshold value determined in accordance with the received power of a received signal from said transmission destination.

4. The communication apparatus defined in claim 2, wherein said communication apparatus comprises an access point or a mobile station.

5. A transmission control method for a communication apparatus in a radio network, comprising:

determining a threshold value in accordance with a radio line quality between a transmission destination of a transmission signal and said communication apparatus, said threshold value being used to decide whether or not transmission of said transmission signal is deferred or ceased; and controlling a transmission by deferring or ceasing transmission of said transmission signal when a signal, which has a received power exceeding said threshold value determined during the determination of said threshold value is received, wherein said determination of a threshold value comprises recording, when a signal received, transmission source information on a received signal and a threshold value corresponding to a received power of said received signal on a threshold value table in said communication apparatus in one-to-one correspondence and then extracting a threshold value corresponding to said transmission destination from said threshold value table to decide whether or not transmission of said transmission signal is deferred or ceased; and wherein said recording comprises, when transmission source information on a received signal and a second threshold value corresponding to received power of the received signal are recorded on said threshold value table, if said threshold value table already includes said transmission source information, rewriting a first threshold value being already recorded on said threshold value table in correspondence with said transmission source information, into a value obtained by weight adding said first value and said second value.

6. A transmission control method for a communication apparatus in a radio network, comprising:

determining a threshold value in accordance with a radio line quality between a transmission destination of a transmission signal and said communication apparatus, said threshold value being used to decide whether or not transmission of said transmission signal is deferred or ceased; and controlling a transmission by deferring or ceasing transmission of said transmission signal when a signal, which has a received power exceeding said threshold value determined during the determination of said threshold value is received, wherein said determination of a threshold value comprises recording, when a signal received, transmission source information on a received signal and a threshold value corresponding to a received power of said received signal on a threshold value table in said communication apparatus in one-to-one correspondence and then extracting a threshold value corresponding to said transmission destination from said threshold value table to decide whether or not transmission of said transmission signal is deferred or ceased; and wherein said recording comprises, when transmission source information on a received signal and a second threshold value corresponding to received power of the received signal are recorded on said threshold value table, if said threshold value table already includes said transmission source information, comparing a first threshold value being always recorded on said threshold value table in correspondence with said transmission source information with said second value, and then rewriting said first value into said second value only when said second value is smaller than said first value.

7. A transmission control method for a communication apparatus in a radio network, comprising:

determining a threshold value in accordance with a radio line quality between a transmission destination of a transmission signal and said communication apparatus, said threshold value being used to decide whether or not transmission of said transmission signal is deferred or ceased; and controlling a transmission by deferring or ceasing transmission of said transmission signal when a signal, which has a received power exceeding said threshold value determined during the determination of said threshold value is received, wherein said determination of a threshold value comprises recording, when a signal received, transmission source information on a received signal and a threshold value corresponding to a received power of said received signal on a threshold value table in said communication apparatus in one-to-one correspondence and then extracting a threshold value corresponding to said transmission destination from said threshold value table to decide whether or not transmission of said transmission signal is deferred or ceased; and wherein when said transmission signal is a signal to be broadcast, a value equal to a minimum value of threshold values recorded on said threshold value table or a noise power level of said communication apparatus plus a predetermined signal-to-noise ratio is used instead of a threshold value determined in accordance with the received power of a received signal from said transmission destination.

8. A program by which a computer executes a transmission control method for a communication apparatus in a radio network, comprising:

determining a threshold value in accordance with the radio line quality between a transmission destination of a transmission signal and said communication apparatus, said threshold value being used to determine whether or not transmission of said transmission signal is deferred or ceased; and controlling a transmission by deferring or ceasing transmission of said transmission signal when a signal, which has a received power exceeding said threshold value determined in said threshold value control step, is received, wherein said threshold value determination comprises recording transmission source information of a received signal and a threshold value corresponding to a received power of said received signal on a threshold value table of said communication apparatus in one-to-one correspondence, and then extracting a threshold value corresponding to said transmission destination from said threshold value table to decide whether or not transmission of said transmission signal is deferred or ceased, and wherein said recording comprises, when transmission source information on a received signal and a second threshold value corresponding to received power of the received signal are recorded on said threshold value table, if said threshold value table already includes said transmission source information, rewriting a first threshold value being already recorded on said threshold value table in correspondence with said transmission source information, into a value obtained by weight adding said first value and said second value.

9. A program by which a computer executes a transmission control method for a communication apparatus in a radio network, comprising:

determining a threshold value in accordance with the radio line quality between a transmission destination of a transmission signal and said communication apparatus, said threshold value being used to determine whether or not transmission of said transmission signal is deferred or ceased; and controlling a transmission by deferring or ceasing transmission of said transmission signal when a signal, which has a received power exceeding said threshold value determined in said threshold value control step, is received, wherein said threshold value determination comprises recording transmission source information of a received signal and a threshold value corresponding to a received power of said received signal on a threshold value table of said communication apparatus in one-to-one correspondence, and then extracting a threshold value corresponding to said transmission destination from said threshold value table to decide whether or not transmission of said transmission signal is deferred or ceased; and wherein said recording comprises, when transmission source information on a received signal and a second threshold value corresponding to received power of the received signal are recorded on said threshold value table, if said threshold value table already includes said transmission source information, comparing a first threshold value being always recorded on said threshold value table in correspondence with said transmission source information with said second value, and then rewriting said first value into said second value only when said second value is smaller than said first value.

10. A program by which a computer executes a transmission control method for a communication apparatus in a radio network, comprising:

determining a threshold value in accordance with the radio line quality between a transmission destination of a transmission signal and said communication apparatus, said threshold value being used to determine whether or not transmission of said transmission signal is deferred or ceased; and controlling a transmission by deferring or ceasing transmission of said transmission signal when a signal, which has a received power exceeding said threshold value determined in said threshold value control step, is received, wherein said threshold value determination comprises recording transmission source information of a received signal and a threshold value corresponding to a received power of said received signal on a threshold value table of said communication apparatus in one-to-one correspondence, and then extracting a threshold value corresponding to said transmission destination from said threshold value table to decide whether or not transmission of said transmission signal is deferred or ceased; and wherein when said transmission signal is a signal to be broadcast, a value equal to a minimum value of threshold values recorded on said threshold value table or a noise power level of said communication apparatus plus a predetermined signal-to-noise ratio is used instead of a threshold value determined in accordance with the received power of a received signal from said transmission destination.

11. A radio network system comprising a plurality of communication apparatuses, each of said communication apparatuses having:

a threshold value controller for determining a threshold value based on a radio line quality between a transmission destination of a transmission signal and the communication apparatus; and a transmission controller for deferring or ceasing transmission of the transmission signal when a received power of the received signal exceeds said threshold value, wherein said threshold value controller includes a threshold value table which records transmission source information on a received signal and a threshold value corresponding to the received power of said received signal in one-to-one correspondence, and extracts a threshold value corresponding to said transmission destination from said threshold value table to decide whether or not transmission of said transmission signal is deferred or ceased; and wherein, when both transmission source information on a received signal and a second threshold value corresponding to the received power of the received signal are recorded on said threshold value table, if said transmission source information already exists in said threshold value table, said threshold value controller rewrites a first threshold value already recorded on said threshold value table and corresponding to said transmission source information into a value obtained by weight adding said first value and said second value.

12. A radio network system comprising a plurality of communication apparatuses, each of said communication apparatuses having:

a threshold value controller for determining a threshold value based on a radio line quality between a transmission destination of a transmission signal and the communication apparatus; and a transmission controller for deferring or ceasing transmission of the transmission signal when a received power of the received signal exceeds said threshold value, wherein said threshold value controller includes a threshold value table which records transmission source information on a received signal and a threshold value corresponding to the received power of said received signal in one-to-one correspondence, and extracts a threshold value corresponding to said transmission destination from said threshold value table to decide whether or not transmission of said transmission signal is deferred or ceased, wherein, when transmission source information on a received signal and a second threshold value corresponding to the received power of the received signal are recorded on said threshold value table, if said transmission source information already exists in said threshold value table, said threshold value controller compares a threshold value being always recorded corresponding to said transmission source information on said first threshold value table with said second value, and then rewrites said first value into said second value only when said second value is smaller than said first value.

13. A radio network system comprising a plurality of communication apparatuses, each of said communication apparatuses having:

a threshold value controller for determining a threshold value based on a radio line quality between a transmission destination of a transmission signal and the communication apparatus; and a transmission controller for deferring or ceasing transmission of the transmission signal when a received power of the received signal exceeds said threshold value, wherein said threshold value controller includes a threshold value table which records transmission source information on a received signal and a threshold value corresponding to the received power of said received signal in one-to-one correspondence, and extracts a threshold value corresponding to said transmission destination from said threshold value table to decide whether or not transmission of said transmission signal is deferred or ceased, wherein when said transmission signal is a signal to be broadcast, a value equal to a minimum value of threshold values recorded on said threshold value table or a noise power level of said communication apparatus plus a predetermined signal-to-noise ratio is used instead of a threshold value determined in accordance with the received power of a received signal from said transmission destination.

14. The radio network system defined in claim 12, wherein each of said communication apparatuses comprises at least one access point or at least one mobile station.

15. The radio network system defined in claim 13, wherein each of said communication apparatuses comprises at least one access point or at least one mobile station.

16. The communication apparatus defined in claim 1, wherein said communication apparatus comprises an access point or a mobile station.

17. The communication apparatus defined in claim 3, wherein said communication apparatus comprises an access point or a mobile station.

18. The radio network system defined in claim 11 wherein each of said communication apparatuses comprises at least one access point or at least one mobile station.

* * * * *